G. H. HAYES.
SPRING SHACKLE.
APPLICATION FILED SEPT. 21, 1915.

1,180,036.

Patented Apr. 18, 1916.

WITNESSES

INVENTOR
GEORGE H. HAYES
BY
ATTORNEYS

UNITED STATES PATENT OFFICE.

GEORGE H. HAYES, OF ST. PAUL, MINNESOTA.

SPRING-SHACKLE.

1,180,036.　　　　Specification of Letters Patent.　　Patented Apr. 18, 1916.

Application filed September 21, 1915. Serial No. 51,847.

*To all whom it may concern:*

Be it known that I, GEORGE H. HAYES, citizen of the United States, resident of St. Paul, county of Ramsey, State of Minnesota, have invented certain new and useful Improvements in Spring-Shackles, of which the following is a specification.

The object of my invention is to provide a yielding connection between the frame of the vehicle and the forward springs which will take up the jar or forward lurch of the frame when the wheels strike an obstruction or drop into a depression in the roadbed.

A further object is to provide a spring shackle device of simple, economical construction and one which can be easily applied to any style of vehicle having a half-elliptic spring and particularly adapted for use on automobiles.

The invention consists generally in various constructions and combinations, all as hereinafter described and particularly pointed out in the claims.

Figure 1:
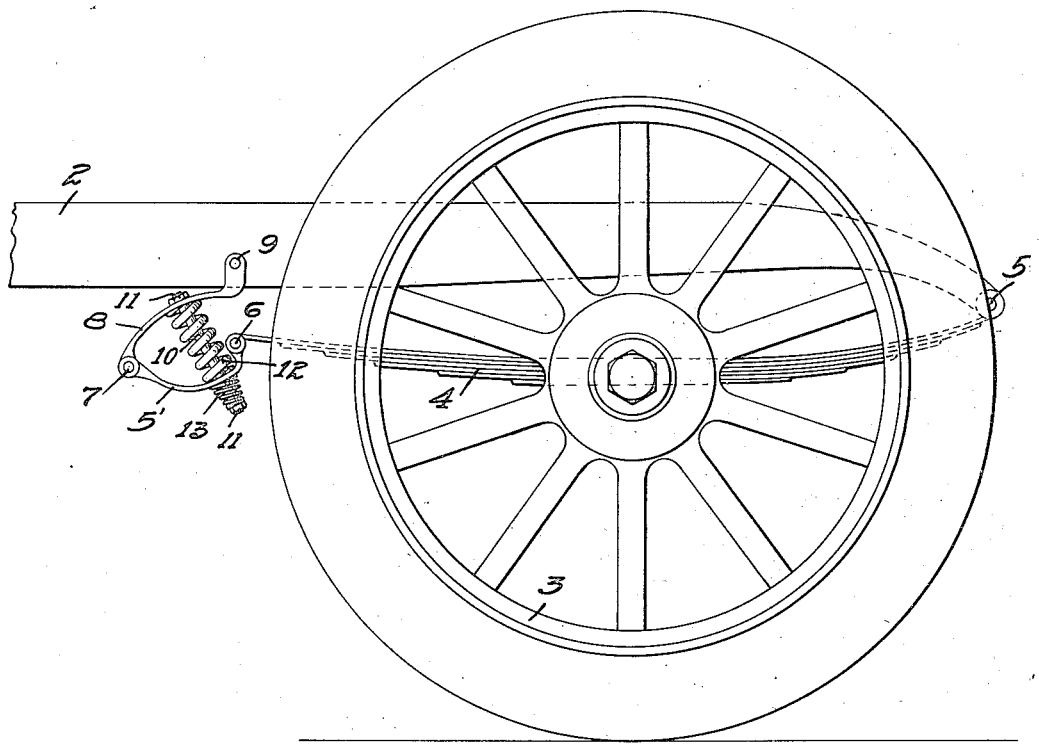
Figure 2:
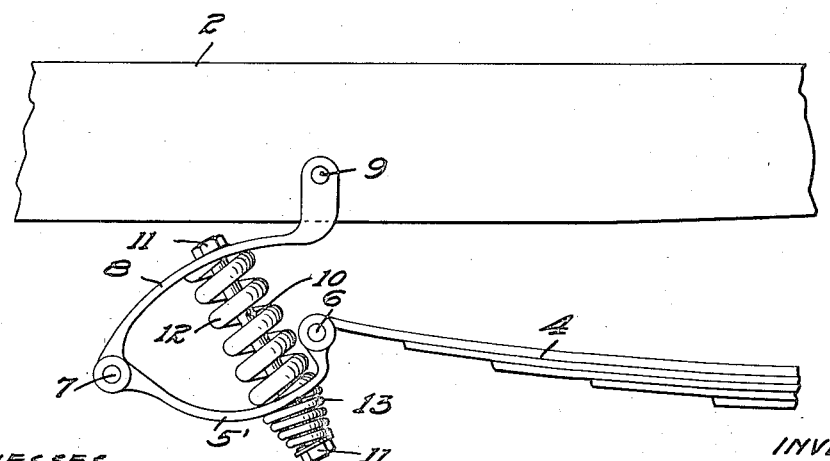

In the accompanying drawings forming part of this specification, Figure 1 is a side elevation of the forward portion of an automobile chassis with my invention applied thereto, Fig. 2 is an enlarged detail view of a portion of the frame and spring, showing the shackle between them.

In the drawing, 2 represents one of the side bars of the chassis and 3 a forward wheel mounted on the axle of the car in the usual way.

4 is a spring of the half-elliptic type, pivotally connected at 5 to the forward end of the bar 2, the middle portion of the spring being secured to the axle in the usual way. At the rear end of the spring I provide a shackle consisting of a link 5' having its forward end pivoted at 6 to the rear end of the spring, the rear end of the link being pivoted at 7 to a carrier 8 which has a pivotal connection at 9 with the sill 2. The spring thus has freedom of movement to allow the rise and fall of the car frame. A bolt 10 passes through holes in the link 5' and the carrier 8 and is provided with threaded ends and nuts 11 therefor and that portion of the bolt between the link 5 and the carrier is provided with a helical spring 12, the ends of which bear respectively on the link and the carrier and yieldingly resist the forward thrust or lurch of the frame.

Beneath the link 5' I prefer to provide a lighter coiled spring 13 bearing at one end on the nut 11 and at its other end on the link 5' and serving to take up the slack and hold the bolt in its proper position with respect to the link and carrier, so that the compression spring 12 will be immediately put under tension upon the initial forward movement or lurch of the vehicle frame. This spring 13 I may designate as a gathering spring, and it also has the function of a snubbing device for catching the rebound of the car. I have found in running a car or other vehicle over rough roads that when the forward wheels strike an obstruction or drop into a depression in the roadway, that the vehicle body will lurch forward through its inertia and the shock or jar resulting from the sudden checking of this forward movement by the springs of the vehicle will be taken up or absorbed by the compression springs 12, there being, of course, a set of these shackles, one on each side of the car.

The springs may be made of different gage of wire, according to the weight of the vehicle body, and the probable weight of the load thereon, and in various ways the details of construction may be modified and still be within the scope of my invention.

I claim as my invention:

1. The combination, with a vehicle frame, of a spring having its forward end attached to said frame and a shackle pivotally connecting the rear end of said spring with said frame, said shackle comprising a rigid link and a rigid carrier pivotally connected to one another at their rear ends, the forward ends of said link and carrier being pivotally connected respectively to said spring and frame, and a compression spring interposed between the pivot of the rear ends of said link and carrier and the pivots of the forward ends thereof for yieldingly resisting relative movement of said link and carrier toward one another.

2. The combination, with a frame, of a side spring pivotally connected therewith, a spring shackle connecting the rear portion of said spring with said frame and comprising members pivotally connected to one another and to said frame and spring respectively, a bolt passing through said members, a compression spring mounted on said bolt between said members, and a second lighter compression spring interposed between one of said members and a stop on said bolt.

3. The combination, with a vehicle frame, and a forward side spring therefor pivotally connected at one end with said frame, of a spring shackle comprising members pivotally connected to one another and to said frame and spring respectively, and a pair of compression springs, one interposed between said members arranged to take up the forward thrust or lurch of said frame and the other seated on one of said members to gather up the slack in the connections of said lurch-resisting spring.

In witness whereof, I have hereunto set my hand this 15th day of September 1915.

GEORGE H. HAYES